(12) United States Patent
Todd et al.

(10) Patent No.: US 12,572,479 B2
(45) Date of Patent: Mar. 10, 2026

(54) DCF SUPPORTED TRUSTWORTHY DATA CACHING IN EDGE ENVIRONMENTS

(71) Applicant: Dell Products L.P., Round Rock, TX (US)

(72) Inventors: Stephen J Todd, North Andover, MA (US); Pankaj Pande, Carlingford (AU)

(73) Assignee: Dell Products L.P., Round Rock, TX (US)

( * ) Notice: Subject to any disclaimer, the term of this patent is extended or adjusted under 35 U.S.C. 154(b) by 60 days.

(21) Appl. No.: 18/786,271

(22) Filed: Jul. 26, 2024

(65) Prior Publication Data

US 2026/0030175 A1    Jan. 29, 2026

(51) Int. Cl.
G06F 12/123        (2016.01)
G06F 12/0882       (2016.01)

(52) U.S. Cl.
CPC ........ G06F 12/123 (2013.01); G06F 12/0882 (2013.01)

(58) Field of Classification Search
None
See application file for complete search history.

(56) References Cited

U.S. PATENT DOCUMENTS

| | | | |
|---|---|---|---|
| 2020/0192811 A1* | 6/2020 | Harnik | G06F 12/121 |
| 2020/0257631 A1* | 8/2020 | Chamarty | G06F 12/0891 |
| 2020/0301840 A1* | 9/2020 | Reed | G06F 12/0864 |
| 2023/0063992 A1* | 3/2023 | Shen | G06F 3/0635 |
| 2023/0222064 A1* | 7/2023 | Reed | G06F 12/0811 |
| | | | 711/122 |
| 2024/0241960 A1* | 7/2024 | King | G06F 21/57 |

* cited by examiner

*Primary Examiner* — Edward J Dudek, Jr.
*Assistant Examiner* — Ralph A Verderamo, III
(74) *Attorney, Agent, or Firm* — Workman Nydegger

(57)        ABSTRACT

A computing system may receive a data stream from a data source of an edge environment. The computing system may identify at least one of a first confidence score or first trust metadata associated with the data stream received from data source. The computing system may apply a caching algorithm to the data stream, the caching algorithm implementing one or more caching parameters that specify criteria to be used to determine if the data stream is to be placed in a data cache. The computing system may, based on the results of applying the caching algorithm and the one of the first confidence score or first trust metadata, determine if the data stream is to be placed in the data cache.

20 Claims, 11 Drawing Sheets

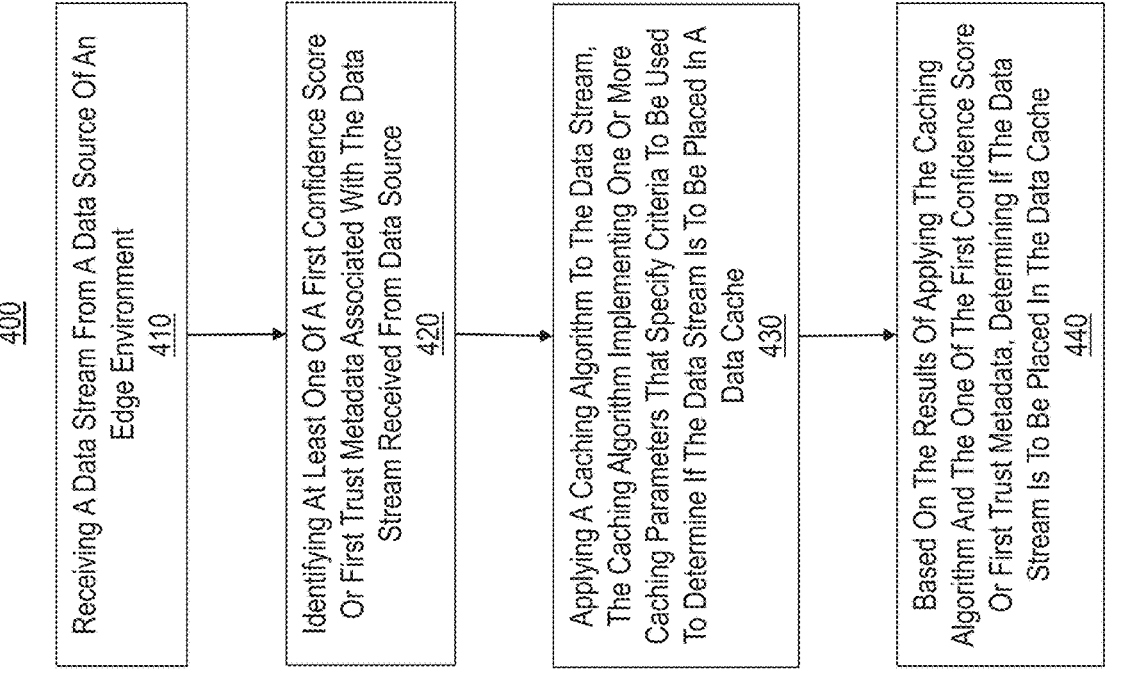

400

Receiving A Data Stream From A Data Source Of An Edge Environment
410

Identifying At Least One Of A First Confidence Score Or First Trust Metadata Associated With The Data Stream Received From Data Source
420

Applying A Caching Algorithm To The Data Stream, The Caching Algorithm Implementing One Or More Caching Parameters That Specify Criteria To Be Used To Determine If The Data Stream Is To Be Placed In A Data Cache
430

Based On The Results Of Applying The Caching Algorithm And The One Of The First Confidence Score Or First Trust Metadata, Determining If The Data Stream Is To Be Placed In The Data Cache
440

Figure 4

DCF SUPPORTED TRUSTWORTHY DATA CACHING IN EDGE ENVIRONMENTS

TECHNOLOGICAL FIELD OF THE DISCLOSURE

Embodiments disclosed herein generally relate to generally relate to data confidence fabric networks and data delivery in data confidence fabric networks. More particularly, at least some embodiments relate to systems, hardware, software, computer-readable media, and methods for using higher confidence data when performing data caching in an edge environment.

BACKGROUND

Computing and other electronic devices come in a variety of types and form factors and have varying capabilities. Many of these devices generate data that may be used by various applications. There is often a question, however, about the value of the data or the confidence that an application can place in the data. In other words, applications benefit from using data in which there is high confidence. Applications that execute using data associated with high confidence levels typically generate more reliable results and outputs.

Applying trust services or functions to data allows applications or users to trust the data and can improve the confidence in how the data is used and in the results of using the data. Providing trust services or functions, however, is not without cost.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

FIG. 4 discloses aspects of a method according to one embodiment; and

DETAILED DESCRIPTION OF SOME EXAMPLE EMBODIMENTS

Figure 1:
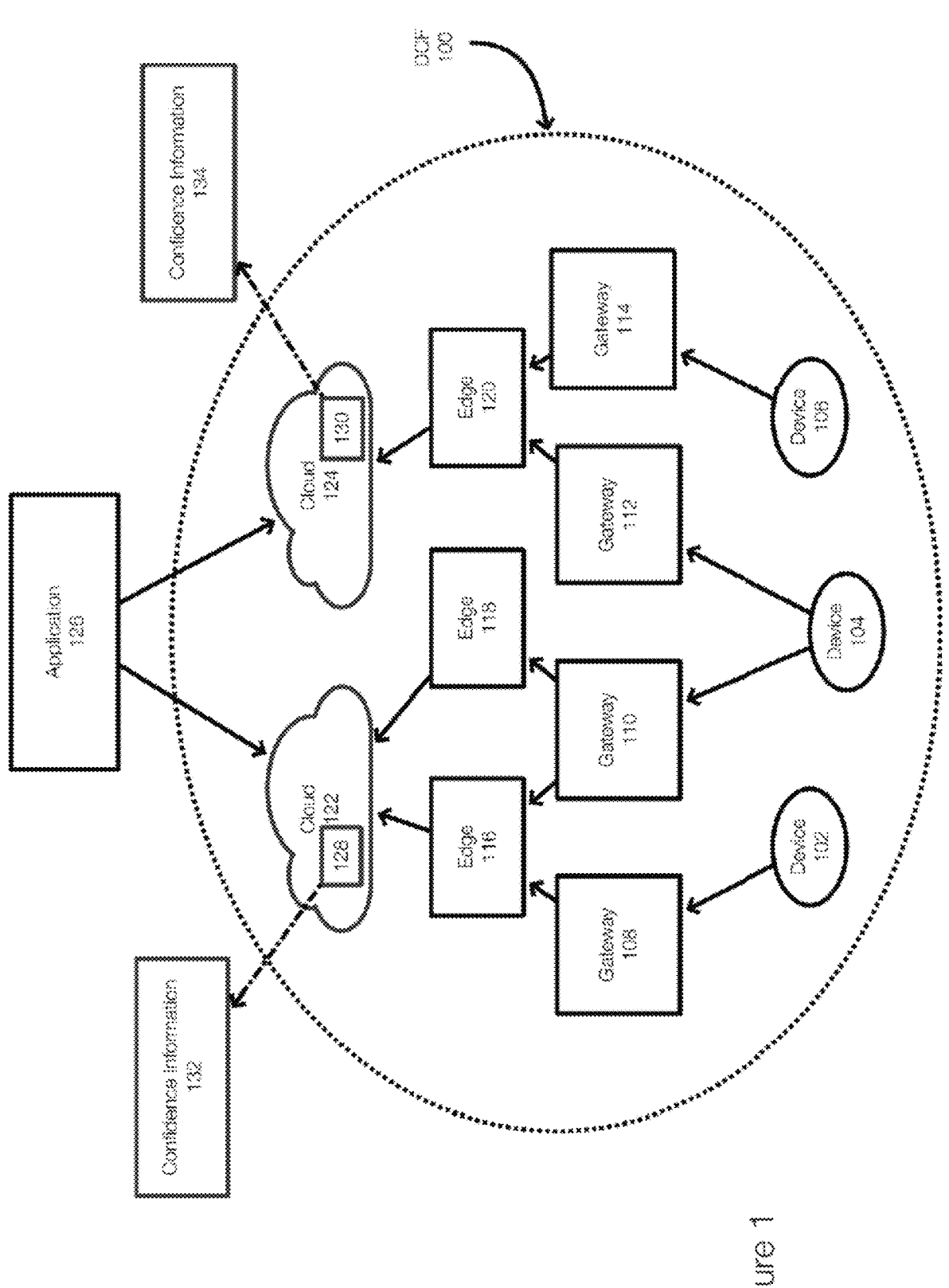
FIG. 1 discloses aspects of a computing system such as a data confidence fabric network.

Embodiments disclosed herein generally relate to generally relate to data confidence fabric networks and data delivery in data confidence fabric networks. More particularly, at least some embodiments relate to systems, hardware, software, computer-readable media, and methods for using higher confidence data when performing data caching in an edge environment.

In one example embodiment, a computing system may receive a data stream from a data source of an edge environment. The computing system may identify at least one of a first confidence score or first trust metadata associated with the data stream received from data source. The computing system may apply a caching algorithm to the data stream, the caching algorithm implementing one or more caching parameters that specify criteria to be used to determine if the data stream is to be placed in a data cache. The computing system may, based on the results of applying the caching algorithm and the one of the first confidence score or first trust metadata, determine if the data stream is to be placed in the data cache.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that an embodiment may provide data for performing a data caching process based on data confidence levels, thus ensuring that higher confidence data is by a computing system when caching data. In an embodiment, various caching parameters are implemented to ensure the proper amount of higher confidence data is used during the data caching process. This leads to a better operation of the computing system as system resources are not wasted on caching low confidence data. In addition, high confidence data is available in the cache for use by various components of the computing system, leading to better results.

A. Aspects of An Example Data Confidence Fabric (DCF)

Embodiments of the present invention generally relate to computing systems or ecosystems such as data confidence fabrics (DCFs). In one example, a DCF is a system or network of hardware (e.g., computers, servers, routers, network interface cards, storage including immutable storage and/or other hardware) that is provisioned (e.g., with software, services) to score or rank data that may be ingested into and/or transmitted through the DCF. Communications in a DCF may include wired (e.g., ethernet) and/or wireless communications. The data ingested into the DCF can be made available to applications, which may also be part of the DCF. The applications can leverage the confidence scores of the data.

In some example embodiments, applications or other data sources may generate and/or share data with other applications or users. Trust in this data can be improved by joining a DCF that is configured to perform trust functions to or on the data. These trust functions (e.g., trust insertion technologies) may be provided by various providers and may be hardware based and/or software based.

A DCF may include an interface system. Applications may access the interface system using, for example, an API (Application Programming Interface). The interface system may be configured to provide publishing functionality and payment as a service functionality such that trust providers can charge a fee for use of their trust functions or trust insertion technologies. In one example, a smart contract may be used to facilitate these publishing and payment operations. In one example, payment may be collected when annotations, which reflect trust functions that have been applied to the data, are written to a distributed ledger. Thus, the payment as a service provided by the DCF is coupled with or relates to the act or step of publishing annotations to a distributed ledger. In another example, the act or step of providing payment as a service may be decoupled from the act or step of publishing trust information.

A DCF is generally configured to add or associate annotations to data. The annotations include confidence information, which can take various forms including a confidence score, trust information, and/or associated metadata. The confidence information can be added from a hardware perspective and/or a software perspective.

A DCF, by way of example only, may be an architecture and set of services that allow data to be ingested and used by applications. The DCF may include or be associated with trust insertion technologies (hardware and/or software) that are applied to the data as the data flows through the DCF. Each time a trust insertion technology is applied, an annotation may be made in a ledger or other structure and the confidence score of the data may be changed. Thus, the confidence score of data provides a view into the trustworthiness of the data to an application. Trust or confidence information can be added from both hardware and software perspectives. Data may be associated with an overall confidence score. In addition, a confidence score may be generated for each trust insertion technology. This allows an application, for example, to evaluate how to trust the data in the context of a specific trust insertion technology.

The trust insertion technologies may be applied by performing trust functions. Further, each of the trust insertion technologies may be associated with a trust provider. A DCF may include various interconnected hardware environments (e.g., nodes).

These nodes may have varying hardware capabilities that are examples of trust insertion technologies or hardware-assisted trust insertion technologies. The hardware is configured, such that as data flows from data sources to storage or to applications in a DCF system, scores or confidence information or other annotations can be attached to or associated with the data. As the data is handled by various forms of trust insertion technologies, the overall score or ranking (e.g., a confidence or trustworthiness score) of the data may change. The data scored or ranked in the DCF system may be stored in various locations, such as a data lake, in a datacenter, Public Cloud data storage service, or the like. The annotations, which may include confidence information, a confidence score and/or rank, is made available to one or more applications or other clients or users. The confidence information may include, in addition to a confidence score and/or rank, tables, audit information, and the like.

Confidence scores, which may be determined from hardware aspects and/or software aspects of a DCF, allow an application to explore or exploit the data for potential analysis or consumption. The confidence score or rank of the data allows an application to understand or account for the trustworthiness of the data. For example, the confidence score of the data may have an impact on whether the data is actually used by the application. An application may require a minimum confidence score or have other requirements related to the confidence score.

For example, an application operating in a nuclear facility may need to use data that are very trustworthy (have a high confidence score) while data that is used by an application to control lights in a home may not need to be as trustworthy (a lower confidence score is acceptable). In the context of a nuclear facility, an application may require that the hardware handling the data be firewalled from outside sources, provide hardware assisted encryption, deterministic routing, or the like or combination thereof while data used to control lights may not require these trust services. The trust functions required or desired by an application can be specified and the DCF may perform these trust functions when available. The payment as a service allows payment to be made for each trust function that is performed, each time annotations are committed to a distributed ledger, or the like.

Note that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

FIG. 1 illustrates an example of a data confidence fabric network (DCF 100). The DCF 100 includes varies computing and hardware components, connections, and environments. The DCF 100 is configured to add confidence information including confidence scores to data flowing in the DCF 100.

FIG. 1 illustrates examples of data routes or paths in the DCF 100. A specific path of specific data may be referred to as a graph. In FIG. 1, data generated by devices 102, 104, and 106 may flow through multiple levels or multiple hardware environments such as gateways 108, 110, 112, and 114, edge nodes 116, 118, 120, and clouds 122 and 124. In one example, the data may be stored in the clouds 122 and 124.

As the data 128 and the data 130 flow through the DCF 100, the DCF 100 may add annotations (e.g., confidence information) to the data. After flowing through the DCF 100, the data 128 (which may have been generated by one of the devices 102, 104, and/or 106) is stored in the cloud 122 and made available to an application 126. Similarly, the data 130 may be made available to the application 126. Alternatively, the data 128 and 130 are delivered directly to the application 126. The data 128 is associated with confidence information 132 and the data 130 is associated with confidence information 134. The confidence information 132 and 134 may include confidence scores, provenance data, audit trails, data graphs, applied trust insertion technologies or trust functions, or the like. Data flowing through a DCF is typically more valuable and useful at least because the confidence scores or ranks of DCF annotated data allow an application to decide how to trust and/or use the associated data.

Figure 2:
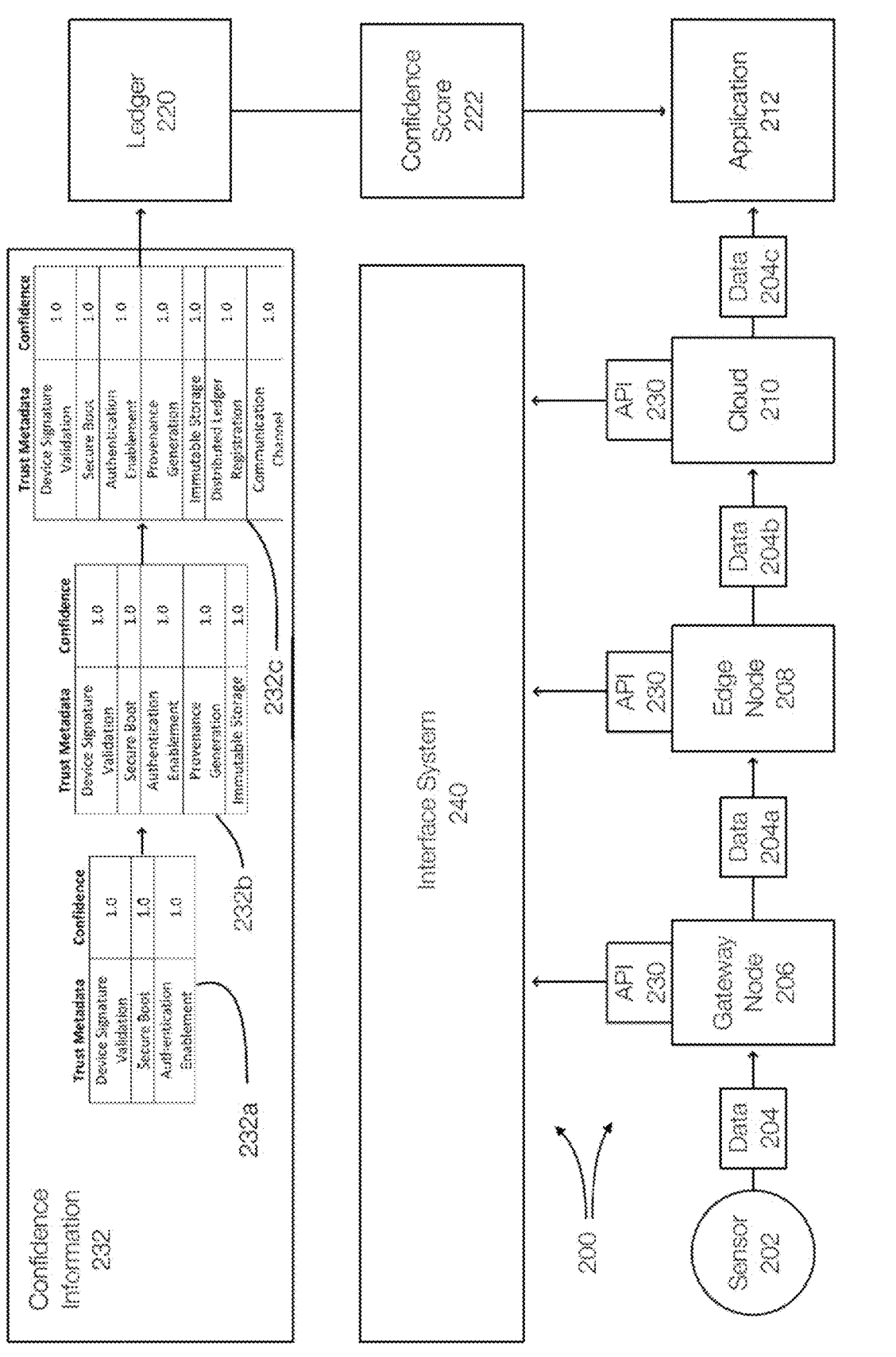
FIG. 2 discloses additional aspects of a computing system such as a data confidence fabric network.

FIG. 2 discloses additional aspects of a data confidence fabric network. FIG. 2 illustrates a DCF 200, which is an example of the DCF 100. In the DCF 200, data 204 is generated by a sensor 202 (or other devices such as user devices) and is ingested into the DCF 200. The data 204 may be received at a gateway node 206, which interfaces with an interface system 240 of the DCF 200 to annotate the data 204 with confidence information.

As illustrated in FIG. 2, confidence information 232 (also referred to as "trust metadata") is generated and accompanies the data 204 as the data 204 is routed in the DCF 200. At the gateway node 206, which may have an embedded Intel TPM chip and the gateway node may use the TPM chip to perform "trust services" on behalf of the owner of the data 204, the data 204 is annotated with confidence information 232a, which relates to trust insertion technologies such as a device signature validation, a secure boot, and an authentication enablement. For example, a "secure boot" annotation, in the confidence information 232a for the gateway node 206, may indicate that the gateway node 206 has not been tampered with. The TPM chip may also provide keys used to perform signature services on the data 204. Each of these trust insertion technologies, in this example, are performed and add a score that is reflected in the confidence information 232a. More specifically, the gateway node 206 may access an interface system 240, which may be a DCF SDK (software development kit), using an application programming interface (API) 230, which is an example of a DCF driver, to record the confidence information 232a. The data 204 and the annotations or confidence information may be transmitted together or maintained separately.

Next, the data 204a (which is the annotated data 204 after passing through the gateway node 206) is routed to an edge node 208 and additional confidence information is added as reflected in the confidence information 232b. Thus, the data 204a arrives at the edge node 208 and is already associated with the confidence information 232a. The edge node 208 may add apply additional trust insertion technologies such as provenance generation and immutable storage. These trust insertion technologies allow the confidence information to be augmented as illustrated by the confidence information 232b. Thus, the data 204b leaving the edge node 208 is associated with the confidence information 232b. In one embodiment, in the example of FIG. 2, the edge node 208 may leverage an ARM secure enclave to perform a "trust service," inspecting the data 204a and performing analytics on it Next, the data 204b arrives at the cloud 210 and additional confidence information is added as illustrated by the confidence information 232c. Thus, the cloud 210 may apply or use a trust insertion technology such as distributed ledger registration and the confidence information 232 is updated as shown by the confidence information 232c.

In one example, the confidence information 232 is stored in a ledger 220. As a result, the confidence information 232 is secure and can be accessed by an application 212. In this example, the data 204 arrives at the application 212 as the annotated data 204c, which is associated with the annotations or confidence information 232c and with a confidence score of, in this example, 7.0. In this example, the confidence information 232c includes confidence information related to the communication channel and the associated score of 1.0 may reflect that the selection, performance, and operation of a selected communication channel was as expected and used to deliver the data 204c. The application 212 thus has insight into the trustworthiness of the data 204 generated at the sensor 202 and has insight into the communication channel.

The confidence score can be generated in different ways. The various trust insertion technologies may be weighted or have different scores. For example, the DCF 200 may be associated with a maximum confidence score (e.g., 10). If the data 204 had followed a different route in the DCF 200, the confidence score may be different. For example, other nodes may have trust insertion technologies that could have increased the confidence score of the data 204. Different routes may also result in lower confidence scores.

C. DCF-Supported Data Caching

C.1 Discussion of Aspects of an Example Embodiment

Figure 3A:
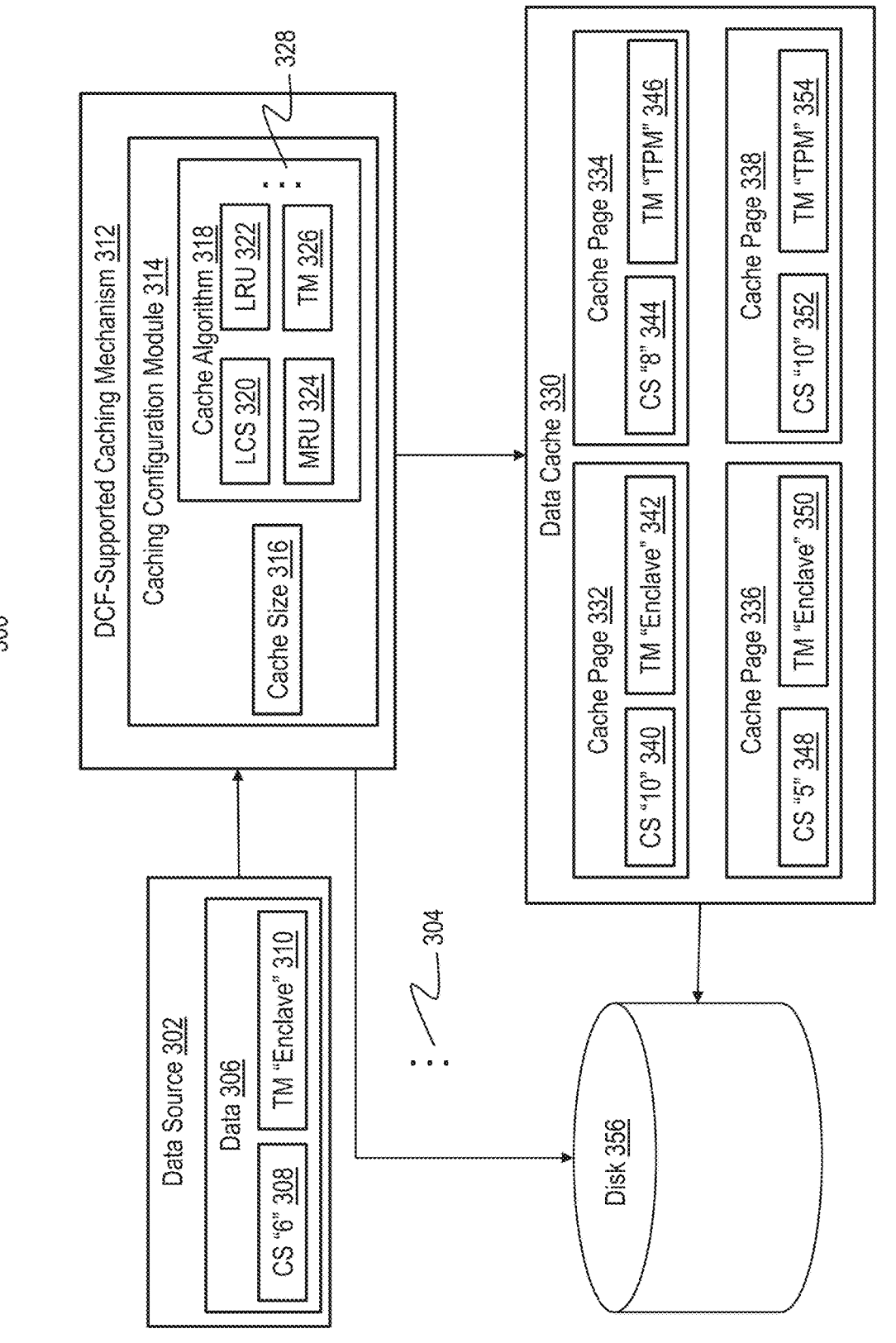
FIGS. 3A-3G disclose aspects of performing data caching in a computing system such as a data confidence fabric network.

With attention now to FIG. 3A, an example architecture 300 according to one embodiment is disclosed. As shown, the architecture 300 may comprise a data source 302, such as an edge entity, for example, that is configured to communicate with each other edge entities. The ellipses illustrate that there can be any number of additional data sources 304 as circumstances warrant. Each of the data sources 302 and 304 may comprise, for example, IoT (internet of things) devices, sensors, user inputs, autonomous vehicles, and/or any other entity(s), any of which may comprise hardware and/or software, that is/are operable to collect and/or generate data. The data sources 302 and 304 may also be a data consumer, that is, a data source may receive data from one or more other data sources, and may process, store, and/or transmit, that data.

In an embodiment, each of the data sources 302 and 304 may comprise a respective node of a DCF, such as DCF 100 or 200 previously described such that data may be generated by the data sources 302 and 304. For example, the data source 302 generates data 306, which may also be referred as a data stream. Although not illustrated, the additional data sources 304 May also generate data.

In an embodiment, the data source 302 assigns a confidence score 308 (also referred to as "CS" 308) to the data that passes through it or is otherwise handled by it. In the embodiment, the confidence score 308 is shown as having the value of 6, wherein in the embodiment the confidence scores are assigned on a scale of 1-10, with 1 being lowest and 10 being highest. Although not illustrated, the additional data sources 304 may also assign a confidence score to its associated data. In one embodiment, the data sources 302 and 304 may comprise various hardware security measures such as a Trusted Execution Environment (TEE), an ARM secure enclave, and a Trusted Platform Module (TPM). As discussed earlier, the TEE, the ARM secure enclave, and the TPM are associated with the trust metadata or confidence information 232. Thus, in FIG. 3A the data 306 is shown as having trust metadata 310 (also referred to as "TM" 310) associated with the ARM secure enclave.

It is often desirable for entities of an edge environment, when performing critical operations, to write data to a cache rather than writing the data to a disk since writing to a cache provides for faster processing. For example, if the system were a multi-sensor IoT monitoring system for a smart building, the data from various data sources such as temperature sensors and energy consumption sensors could be written to the cache so that such data could be analyzed quickly so that changes could be made to environmental conditions of the smart building. However, traditional caching mechanisms do not account for data confidence levels. That is, without taking data confidence levels into account, lower confidence data may be placed into the cache, causing the cache resources to be used less efficiently. Advantageously, the embodiments disclosed herein provide for a DCF-supported caching mechanism 312 that helps ensure that data having a high confidence score, and thus is likely to be high quality data, is placed into the data cache.

Accordingly, in the embodiment of FIG. 3A, the DCF-supported caching mechanism 312 includes a caching configuration module 314. The caching configuration module 314 keeps track of a cache size 316 for a data cache 330 of an edge node of the DCF 100 or 200 previously described.

In addition, the caching configuration module 314 includes a cache algorithm 318 that is used by the caching configuration module 314 to determine if data received from the data sources 302 and/or 304 is to be placed into the data cache 330. The cache algorithm 318 implements various parameters that specify criteria to be used when determining if data received from the data sources 302 and/or 304 is to be placed into the data cache 330. For example, the cache algorithm 318 may implement a lowest confidence score ("LCS") parameter 320, a least-recently-used ("LRU") parameter 322, a most-recently-used ("MRU") parameter 324, and a trust metadata ("TM") parameter 326. The ellipses represent that there can be any number of additional parameters 328 as needed. In the embodiment, the cache algorithm 318 is configurable by a user of the DCF 100 or 200 to determine which parameter or combination of parameters will be implemented by the cache algorithm 318 as will be explained in more detail to follow.

In the embodiment, the data cache 330 has a size for four cache pages. For example, a cache page 332, a cache page 334, a cache page 336, and a cache page 338 that include data received from the data sources 302 and/or 304 have been placed in the data cache 330. The cache page 332 includes data that has been assigned a confidence score 340 (also referred to as "CS" 340) of 10 and that has trust metadata 342 (also referred to as "TM" 342) associated with the ARM secure enclave. The cache page 334 includes data that has been assigned a confidence score 344 (also referred to as "CS" 344) of 8 and that has trust metadata 346 (also referred to as "TM" 346) associated with the TPM chip. The cache page 336 includes data that has been assigned a confidence score 348 (also referred to as "CS" 348) of 5 and that has trust metadata 350 (also referred to as "TM" 350) associated with the ARM secure enclave. The cache page 338 includes data that has been assigned a confidence score 352 (also referred to as "CS" 352) of 10 and that has trust metadata 354 (also referred to as "TM" 354) associated with the TPM chip.

In the embodiment, the data cache 330 is associated with a disk 356. In operation, the data cache 330 may place any cache page being displaced from the data cache 330 in the disk 356. In addition, the DCF-supported caching mechanism 312 can store data in the disk 356 when the data is not placed in the data cache 330 as will be explained.

Figure 3B:
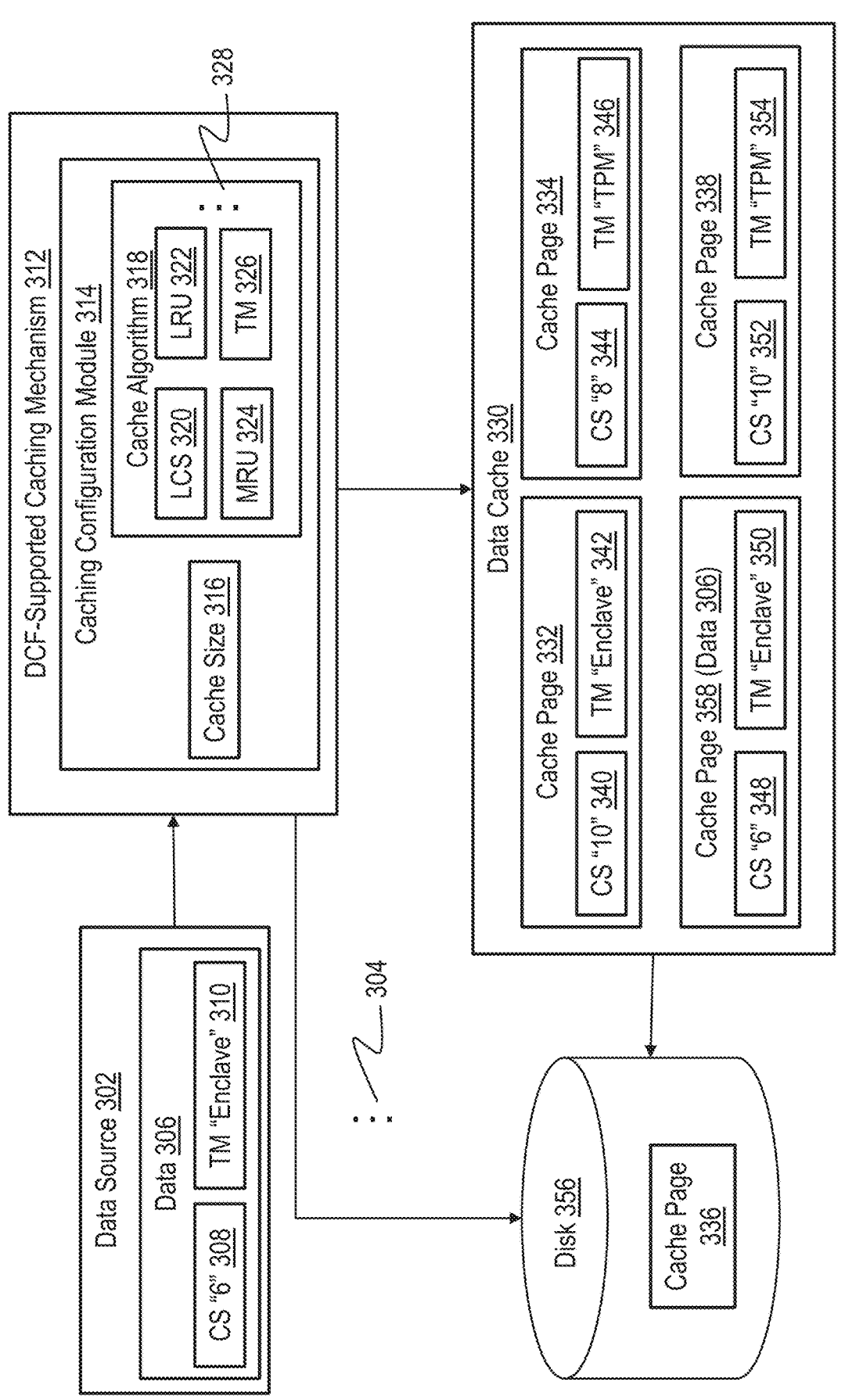

FIG. 3B illustrates an embodiment of the operation of the DCF-supported caching mechanism 312 in the embodiment of FIG. 3A. As shown in FIG. 3B, the DCF-supported caching mechanism 312 receives the data 306 from the data source 302. The caching configuration module 314 determines from the cache size 316 that the data cache 330 can store four cache pages and that the data cache 330 is currently storing four cache pages. Accordingly, the caching configuration module 314 applies the cache algorithm 318 to the data 306 to determine if the data 306 should be stored in the data cache 330.

In the embodiment of FIG. 3B, the caching configuration module 314 is configured to implement a cache algorithm 318 that uses the lowest confidence score parameter 320 as a parameter for specifying the criteria to be used when determining if data received from the data source 302 is to be placed into the data cache 330. Accordingly, the caching configuration module 314 determines that the cache page 336 has a confidence score of 5, which is the lowest confidence score of all of the cache pages and is lower than the confidence score of 6 of the data 306. In response, the caching configuration module 314 removes the cache page 336 from the data cache 330 and writes a new cache page 358 that comprises the data 306 in its place. In some embodiments, the caching configuration module 314 may write the cache page 336 to the disk 356 once it has been removed from the data cache 330.

Figure 3C:
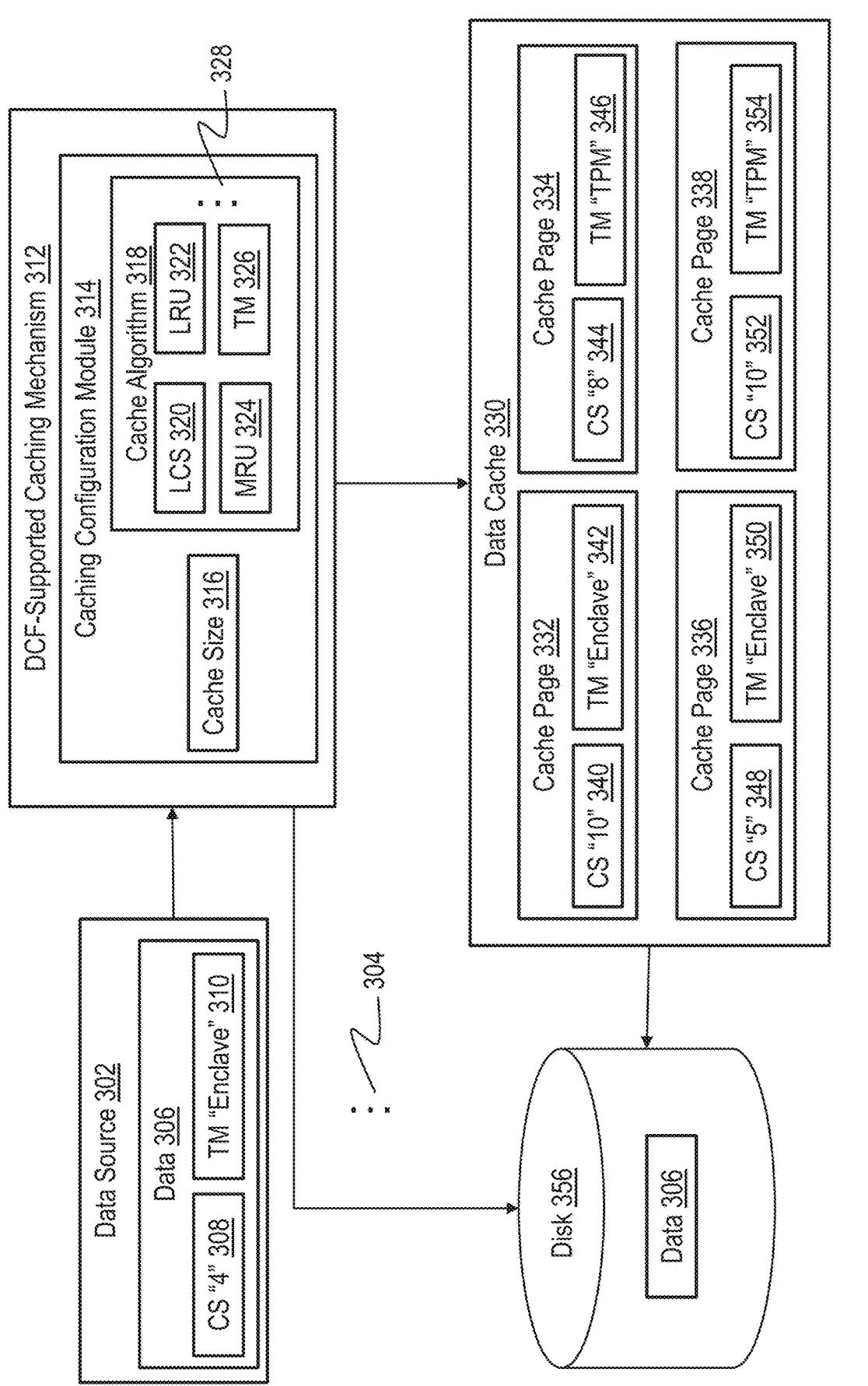

FIG. 3C illustrates a further embodiment of the operation of the DCF-supported caching mechanism 312 in the embodiment of FIG. 3A. In the embodiment of FIG. 3C, the confidence score 308 of the data 306 has been assigned a value of 4. In the embodiment, the DCF-supported caching mechanism 312 receives the data 306 from the data source 302. The caching configuration module 314 determines from the cache size 316 that the data cache 330 can store four cache pages and that the data cache 330 is currently storing four cache pages. Accordingly, the caching configuration module 314 applies the cache algorithm 318 to the data 306 to determine if the data 306 should be stored in the data cache 330.

In the embodiment of FIG. 3C, the caching configuration module 314 is configured to implement a cache algorithm 318 that uses the lowest confidence score parameter 320 as a parameter for specifying the criteria to be used when determining if data received from the data source 302 is to be placed into the data cache 330. Accordingly, the caching configuration module 314 determines that the confidence score 308 of the data 306, being 4, has a lower confidence score than any of the confidence scores of the cache pages 332-338. Since the confidence score 308 is the lowest confidence score, the caching configuration module 314 does not place the data 306 into the data cache 330 by replacing any of the existing cache pages. In some embodiments, the caching configuration module 314 may write data 306 to the disk 356 once it has been rejected from being placed in the data cache 330.

Figure 3D:
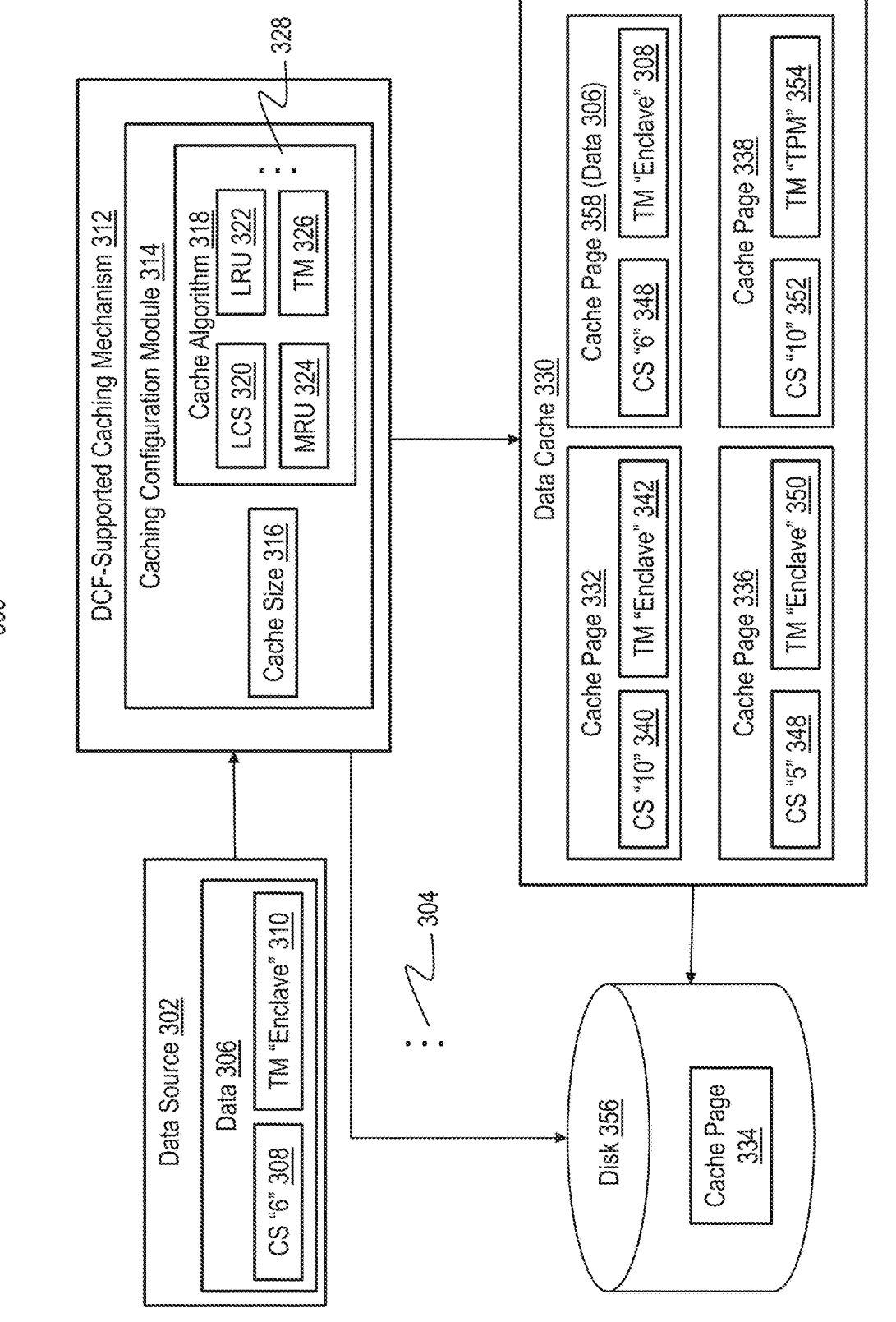

FIG. 3D illustrates an embodiment of the operation of the DCF-supported caching mechanism 312 in the embodiment of FIG. 3A. As shown in FIG. 3B, the DCF-supported caching mechanism 312 receives the data 306 from the data source 302. The caching configuration module 314 determines from the cache size 316 that the data cache 330 can store four cache pages and that the data cache 330 is currently storing four cache pages. Accordingly, the caching configuration module 314 applies the cache algorithm 318 to the data 306 to determine if the data 306 should be stored in the data cache 330.

In the embodiment of FIG. 3D, the caching configuration module 314 is configured to implement a cache algorithm 318 that uses the trust metadata ("TM") parameter 326 as the parameter for specifying the criteria to be used when determining if data received from the data source 302 is to be placed into the data cache 330. In the embodiment, the desired trust metadata parameter is data associated with the ARM secure enclave.

Accordingly, the caching configuration module 314 determines that the cache page 334 includes data having trust metadata 346 associated with the TPM chip and the cache page 336 includes data having trust metadata 354 associated with the TPM chip while the data 306 has trust metadata 310 associated with the ARM secure enclave. In response, the caching configuration module 314 removes the cache page 334 from the data cache 330 and writes a new cache page 358 that comprises the data 306 in its place. In some embodiments, the caching configuration module 314 may write the cache page 336 to the disk 356 once it has been removed from the data cache 330.

It will be appreciated that in the embodiment of FIG. 3D, the data 306 was assigned a confidence score 308 with a value of 6, which is lower than the confidence score 344 having a value of 8 of the data included in the cache page 334. However, in this embodiment the important parameter is the trust metadata parameter. Thus, even though the data 306 has a lower confidence score, the fact that it is associated with the ARM secure enclave is what is important in determining if the data 306 should be placed in the data cache 330.

Figure 3E:
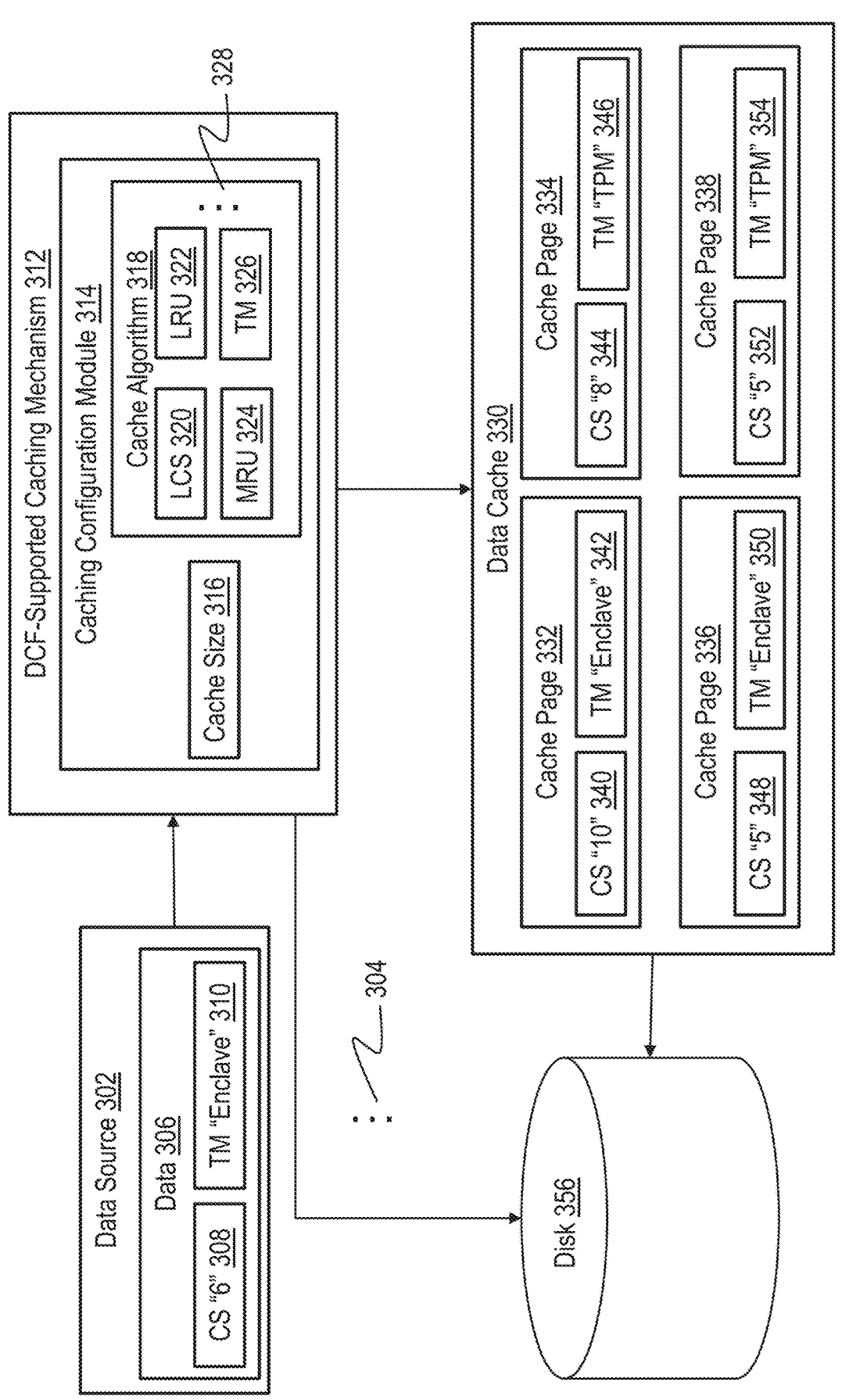

FIG. 3E illustrates a further embodiment of the example architecture 300. In the embodiment of FIG. 3E, the cache page 338 is shown as including data that has been assigned a confidence score 352 of 5, which is the same value as the confidence score 348 of the cache page 336. The other remaining elements are the same as in FIG. 3A.

Figure 3F:
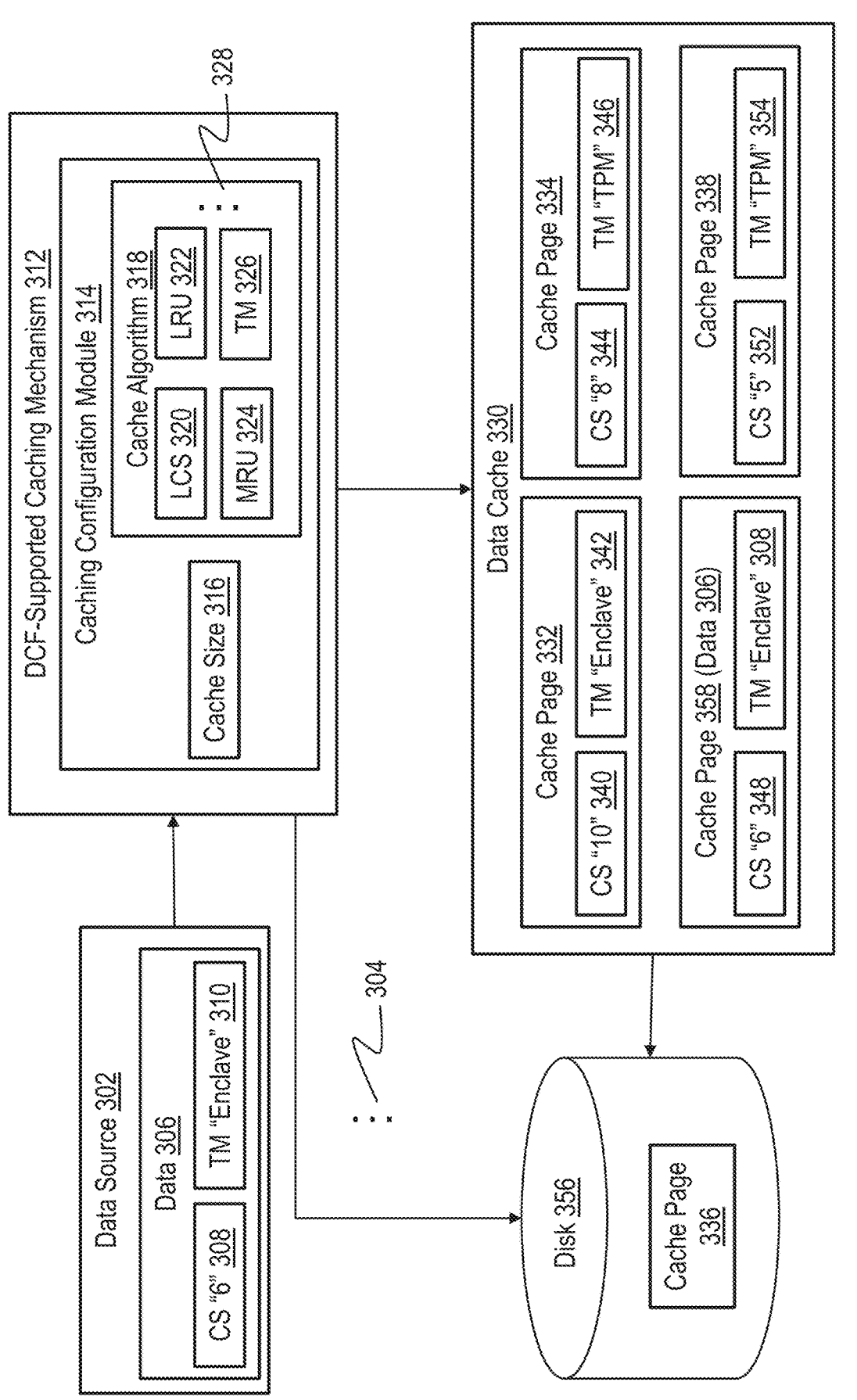

FIG. 3F illustrates an embodiment of the operation of the DCF-supported caching mechanism 312 in the embodiment of FIG. 3E. As shown in FIG. 3F, the DCF-supported caching mechanism 312 receives the data 306 from the data source 302. The caching configuration module 314 determines from the cache size 316 that the data cache 330 can store four cache pages and that the data cache 330 is currently storing four cache pages. Accordingly, the caching configuration module 314 applies the cache algorithm 318 to the data 306 to determine if the data 306 should be stored in the data cache 330.

In the embodiment of FIG. 3F, the caching configuration module 314 is configured to implement a cache algorithm 318 that uses the lowest confidence score parameter 320 as a parameter for specifying the criteria to be used when determining if data received from the data source 302 is to be placed into the data cache 330. However, the caching configuration module 314 determines that the cache page 336 and the cache page 338 both have a confidence score of 5, which is the lowest confidence score of all of the cache pages and is lower than the confidence score of 6 of the data 306.

Since there are more than one cache page having the lowest confidence score, the cache algorithm 318 is further configured to implement one or more additional parameters to determine if the data received from the data source 302 is to be placed into the data cache 330. In the current embodiment, suppose the cache algorithm 318 is configured to further apply the least-recently-used ("LRU") parameter 322. In addition, suppose that the cache page 336 was the least-recently-used cache page. Accordingly, the caching configuration module 314 determines that the cache page 336 should be removed from the data cache 330.

In response, the caching configuration module 314 removes the cache page 336 from the data cache 330 and writes a new cache page 358 that comprises the data 306 in its place. In some embodiments, the caching configuration module 314 may write the cache page 336 to the disk 356 once it has been removed from the data cache 330. It will be appreciated that the same result would occur if the cache algorithm 318 was configured to further apply the most-recently-used ("MRU") parameter 324 and the cache page 336 was the most-recently-used cache page.

Figure 3G:
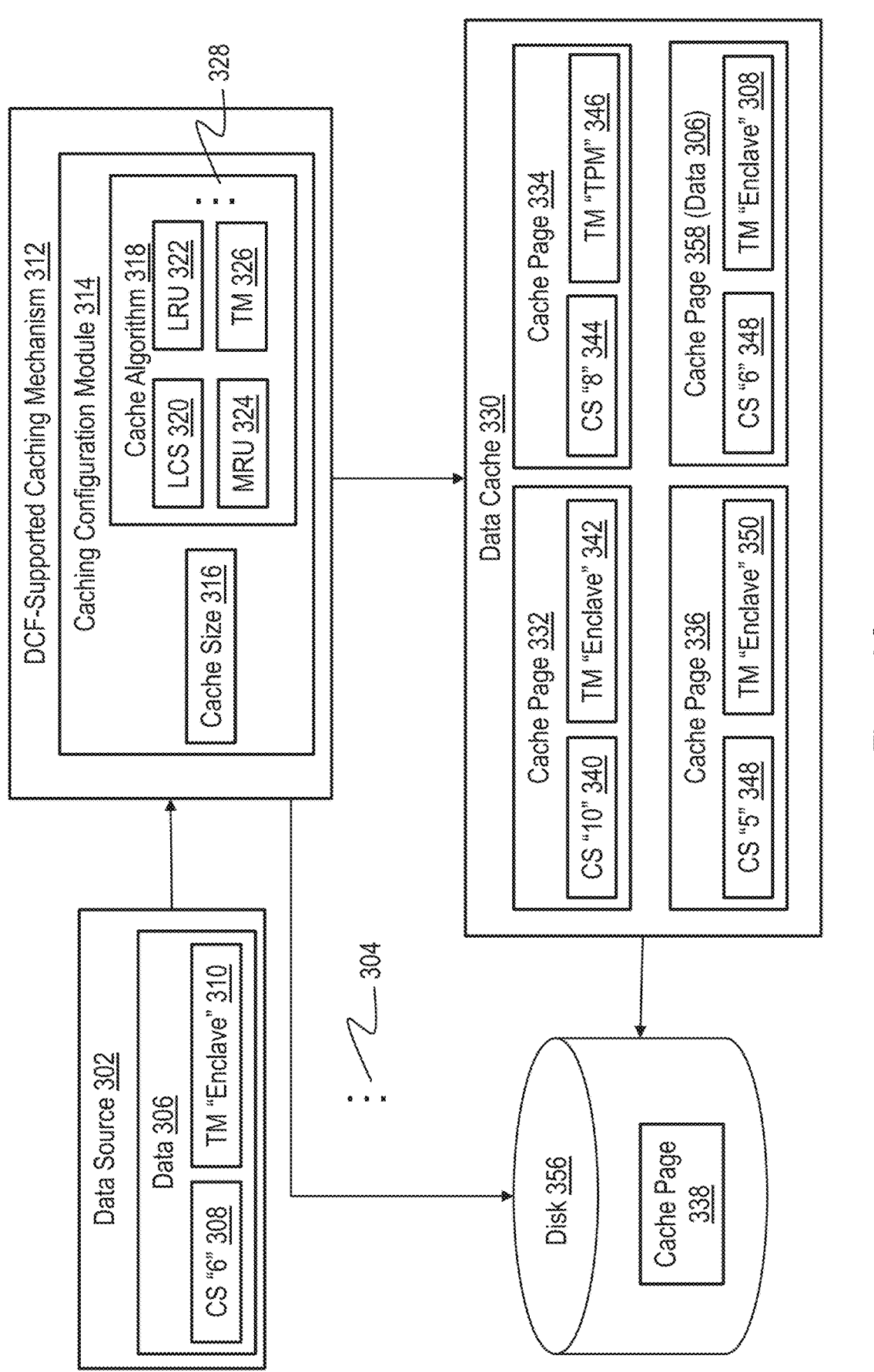

FIG. 3G illustrates an embodiment of the operation of the DCF-supported caching mechanism 312 in the embodiment of FIG. 3E. As shown in FIG. 3G, the DCF-supported caching mechanism 312 receives the data 306 from the data source 302. The caching configuration module 314 determines from the cache size 316 that the data cache 330 can store four cache pages and that the data cache 330 is currently storing four cache pages. Accordingly, the caching configuration module 314 applies the cache algorithm 318 to the data 306 to determine if the data 306 should be stored in the data cache 330.

In the embodiment of FIG. 3G, the caching configuration module 314 is configured to implement a cache algorithm 318 that uses the lowest confidence score parameter 320 as a parameter for specifying the criteria to be used when determining if data received from the data source 302 is to be placed into the data cache 330. Accordingly, the caching configuration module 314 determines that the cache page 336 and the cache page 338 both have a confidence score of 5, which is the lowest confidence score of all of the cache pages and is lower than the confidence score of 6 of the data 306.

Since there are more than one cache page having the lowest confidence score, the cache algorithm 318 is further configured to implement one or more additional parameters to determine if the data received from the data source 302 is to be placed into the data cache 330. In the current embodiment, suppose the cache algorithm 318 is configured to further apply the trust metadata ("TM") parameter 326 and that the desired trust metadata parameter is data associated with the ARM secure enclave. As shown in FIG. 3E, the cache page 336 includes data having trust metadata 350 associated with the ARM secure enclave and the cache page 338 includes data having trust metadata 354 associated with the TPM chip. Accordingly, the caching configuration module 314 determines that the cache page 338 should be removed from the data cache 330.

In response, the caching configuration module 314 removes the cache page 338 from the data cache 330 and writes a new cache page 358 that comprises the data 306 in its place since the cache page 358 has both a higher confidence score and trust metadata associated with the ARM secure enclave. In some embodiments, the caching configuration module 314 May write the cache page 338 to the disk 356 once it has been removed from the data cache 330.

D. Example Methods

It is noted that any operation(s) of any of the methods disclosed herein, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 4, an example method 400 is disclosed. The method 400 will be described in relation to one or more of the figures previously described, although the method 400 is not limited to any particular embodiment.

The method 400 includes receiving a data stream from a data source of an edge environment (410). For example, as previously described the DCF-supported caching mechanism 312 receives the data 306 from the data source 302. Data can also be received from the additional data sources 304.

The method 400 includes identifying at least one of a first confidence score or first trust metadata associated with the data stream received from data source (420). For example, as previously described the DCF-supported caching mechanism 312 identifies the confidence score 308 and the trust metadata 310 that is associated with the data 306.

The method 400 includes applying a caching algorithm to the data stream, the caching algorithm implementing one or more caching parameters that specify criteria to be used to determine if the data stream is to be placed in a data cache (430). For example, as previously described the DCF-supported caching mechanism 312 uses the caching configuration module to apply the cache algorithm 318. The cache algorithm 318 may implement a lowest confidence score ("LCS") parameter 320, a least-recently-used ("LRU") parameter 322, a most-recently-used ("MRU") parameter 324, and a trust metadata ("TM") parameter 326.

The method 400 includes based on the results of applying the caching algorithm and the one of the first confidence score or first trust metadata, determining if the data stream is to be placed in the data cache (440). For example, as previously described, the DCF-supported caching mechanism 312 determine if the data 306 is to be placed in the data cache 330. As previously described, there are various ways this determination is made.

E. Further Example Embodiments

Following are some further example embodiments. These are presented only by way of example and are not intended to limit the scope of this disclosure or the claims in any way.

Embodiment 1. A method, comprising: receiving a data stream from a data source of an edge environment; identifying at least one of a first confidence score or first trust metadata associated with the data stream received from data source; applying a caching algorithm to the data stream, the caching algorithm implementing one or more caching parameters that specify criteria to be used to determine if the data stream is to be placed in a data cache; and based on the results of applying the caching algorithm and the one of the first confidence score or first trust metadata, determining if the data stream is to be placed in the data cache.

Embodiment 2. The method as recited in embodiment 1, wherein the plurality of edge nodes comprise respective nodes of a data confidence fabric (DCF).

Embodiment 3. The method as recited in embodiments 1-2, wherein the first confidence score concerns performance of hardware and/or software of each of the data source.

Embodiment 4. The method as recited in any of embodiments 1-3, further comprising: placing the data stream in the data cache when it is determined that the data stream is to be placed in the data cache; and placing the data stream in a disk when it is determined that the data stream is not to be placed in the data cache.

Embodiment 5. The method as recited in any of embodiments 1-4, further comprising: determining a size of the data cache.

Embodiment 6. The method as recited in any of embodiments 1-5, wherein the caching algorithm implements a caching parameter that specifies a lowest confidence score as the criteria to be used to determine if the data stream is to be placed in the data cache, determining if the data stream is to be placed in the data cache comprising: determining that a cache page stored in the data cache includes data having a second confidence score that is lower than the first confidence score of the data stream; in response, removing the cache page from the data cache; and placing the data stream in the data cache in place of the cache page that has been removed.

Embodiment 7. The method as recited in any of embodiments 1-6, wherein the caching algorithm implements a caching parameter that specifies a lowest confidence score as the criteria to be used to determine if the data stream is to be placed in the data cache, determining if the data stream is to be placed in the data cache comprising: determining that no cache pages stored in the data cache include data having a second confidence score that is lower than the first confidence score of the data stream; and in response, placing the data stream in a disk rather than placing the data stream in the data cache.

Embodiment 8. The method as recited in any of embodiments 1-7, wherein the caching algorithm implements a caching parameter that specifies the first trust metadata of the data stream as the criteria to be used to determine if the data stream is to be placed in the data cache, determining if the data stream is to be placed in the data cache comprising: determining that a cache page stored in the data cache includes data that is associated with second trust metadata that is different from the first trust metadata of the data stream; in response, removing the cache page from the data cache; and placing the data stream in the data cache in place of the cache page that has been removed, wherein the cache page is removed from the data cache even if the cache page includes data having a second confidence score that is higher than the first confidence score of the data stream.

Embodiment 9. The method as recited in any of embodiments 1-8, wherein the caching algorithm implements a first caching parameter that specifies a lowest confidence score as the criteria to be used to determine if the data stream is to be placed in the data cache, determining if the data stream is to be placed in the data cache comprising: determining that a first cache page stored in the data cache includes data having a second confidence score that is lower than the first confidence score of the data stream and that a second cache page stored in the data cache includes data having a third confidence score that is lower than the first confidence score of the data stream; in response, implementing a second caching parameter that specifies one of a least-recently-used cache page or a most-recently used cache page as the criteria to be used to determine if the data stream is to be placed in the data cache; in response, determining that the first cache page is one of a least-recently-used cache page or a most-recently used cache page; in response, removing the first cache page from the data cache; and placing the data stream in the data cache in place of the first cache page that has been removed.

Embodiment 10. The method as recited in any of embodiments 1-9, wherein the caching algorithm implements a first caching parameter that specifies a lowest confidence score as the criteria to be used to determine if the data stream is to be placed in the data cache, determining if the data stream is to be placed in the data cache comprising: determining that a first cache page stored in the data cache includes data having a second confidence score that is lower than the first confidence score of the data stream and that a second cache page stored in the data cache includes data having a third confidence score that is lower than the first confidence score of the data stream; in response, implementing a second caching parameter that specifies the first trust metadata of the data stream as the criteria to be used to determine if the data stream is to be placed in the data cache; in response, determining that the first cache page includes data that is associated with second trust metadata that is different from the first trust metadata of the data stream; in response, removing the first cache page from the data cache; and placing the data stream in the data cache in place of the first cache page that has been removed.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that are executed on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to conduct executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
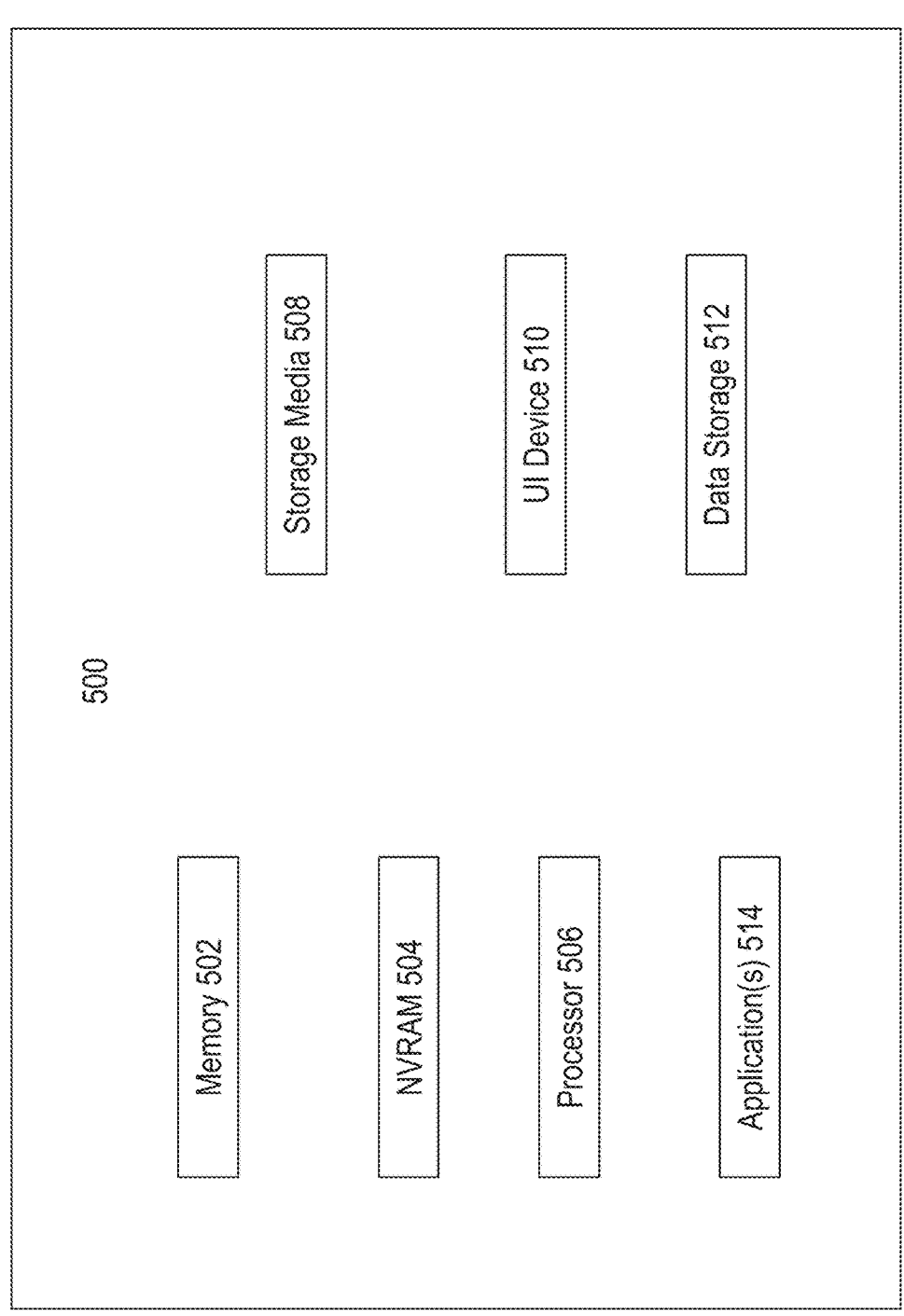
FIG. 5 discloses a computing entity configured and operable to perform any of the disclosed methods, processes, and operations.

With reference briefly now to FIG. 5, any one or more of the entities disclosed, or implied, by FIGS. 1-4, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a data stream from a data source of an edge environment;
   identifying at least one of a first confidence score or first trust metadata associated with the data stream received from data source;
   applying a caching algorithm to the data stream, the caching algorithm implementing one or more caching parameters that specify criteria to be used to determine if the data stream is to be placed in a data cache; and
   based on results of applying the caching algorithm and the one of the first confidence score or first trust metadata, determining if the data stream is to be placed in the data cache.

2. The method of claim 1, wherein the data source comprises a respective node of a data confidence fabric (DCF).

3. The method of claim 1, wherein the first confidence score concerns performance of hardware and/or software in the data source.

4. The method of claim 1, further comprising:
   placing the data stream in the data cache when it is determined that the data stream is to be placed in the data cache; and
   placing the data stream in a disk when it is determined that the data stream is not to be placed in the data cache.

5. The method of claim 1, further comprising:
   determining a size of the data cache.

6. The method of claim 1, wherein the caching algorithm implements a caching parameter that specifies a lowest confidence score as the criteria to be used to determine if the data stream is to be placed in the data cache, determining if the data stream is to be placed in the data cache comprising:
   determining that a cache page stored in the data cache includes data having a second confidence score that is lower than the first confidence score of the data stream;
   in response, removing the cache page from the data cache; and
   placing the data stream in the data cache in place of the cache page that has been removed.

7. The method of claim 1, wherein the caching algorithm implements a caching parameter that specifies a lowest confidence score as the criteria to be used to determine if the data stream is to be placed in the data cache, determining if the data stream is to be placed in the data cache comprising:
   determining that no cache pages stored in the data cache include data having a second confidence score that is lower than the first confidence score of the data stream; and
   in response, placing the data stream in a disk rather than placing the data stream in the data cache.

8. The method of claim 1, wherein the caching algorithm implements a caching parameter that specifies the first trust metadata of the data stream as the criteria to be used to determine if the data stream is to be placed in the data cache, determining if the data stream is to be placed in the data cache comprising:
   determining that a cache page stored in the data cache includes data that is associated with second trust metadata that is different from the first trust metadata of the data stream;
   in response, removing the cache page from the data cache; and
   placing the data stream in the data cache in place of the cache page that has been removed,
   wherein the cache page is removed from the data cache even if the cache page includes data having a second confidence score that is higher than the first confidence score of the data stream.

9. The method of claim 1, wherein the caching algorithm implements a first caching parameter that specifies a lowest confidence score as the criteria to be used to determine if the data stream is to be placed in the data cache, determining if the data stream is to be placed in the data cache comprising:
   determining that a first cache page stored in the data cache includes data having a second confidence score that is lower than the first confidence score of the data stream and that a second cache page stored in the data cache includes data having a third confidence score that is lower than the first confidence score of the data stream;
   in response, implementing a second caching parameter that specifies one of a least-recently-used cache page or a most-recently used cache page as the criteria to be used to determine if the data stream is to be placed in the data cache;
   in response, determining that the first cache page is one of a least-recently-used cache page or a most-recently used cache page;
   in response, removing the first cache page from the data cache; and
   placing the data stream in the data cache in place of the first cache page that has been removed.

10. The method of claim 1, wherein the caching algorithm implements a first caching parameter that specifies a lowest confidence score as the criteria to be used to determine if the data stream is to be placed in the data cache, determining if the data stream is to be placed in the data cache comprising:
   determining that a first cache page stored in the data cache includes data having a second confidence score that is lower than the first confidence score of the data stream and that a second cache page stored in the data cache includes data having a third confidence score that is lower than the first confidence score of the data stream;
   in response, implementing a second caching parameter that specifies the first trust metadata of the data stream as the criteria to be used to determine if the data stream is to be placed in the data cache;
   in response, determining that the first cache page includes data that is associated with second trust metadata that is different from the first trust metadata of the data stream;
   in response, removing the first cache page from the data cache; and
   placing the data stream in the data cache in place of the first cache page that has been removed.

11. A non-transitory storage medium having stored therein instructions that are executable by one or more hardware processors to perform operations comprising:

receiving a data stream from a data source of an edge environment;

identifying at least one of a first confidence score or first trust metadata associated with the data stream received from data source;

applying a caching algorithm to the data stream, the caching algorithm implementing one or more caching parameters that specify criteria to be used to determine if the data stream is to be placed in a data cache; and based on results of applying the caching algorithm and the one of the first confidence score or first trust metadata, determining if the data stream is to be placed in the data cache.

12. The non-transitory storage medium of claim 11, wherein the data source comprises a respective node of a data confidence fabric (DCF).

13. The non-transitory storage medium of claim 11, wherein the first confidence score concerns performance of hardware and/or software in the data source.

14. The non-transitory storage medium of claim 11, further comprising:

placing the data stream in the data cache when it is determined that the data stream is to be placed in the data cache; and placing the data stream in a disk when it is determined that the data stream is not to be placed in the data cache.

15. The non-transitory storage medium of claim 11, further comprising:

determining a size of the data cache.

16. The non-transitory storage medium of claim 11, wherein the caching algorithm implements a caching parameter that specifies a lowest confidence score as the criteria to be used to determine if the data stream is to be placed in the data cache, determining if the data stream is to be placed in the data cache comprising:

determining that a cache page stored in the data cache includes data having a second confidence score that is lower than the first confidence score of the data stream;

in response, removing the cache page from the data cache; and placing the data stream in the data cache in place of the cache page that has been removed.

17. The non-transitory storage medium of claim 11, wherein the caching algorithm implements a caching parameter that specifies a lowest confidence score as the criteria to be used to determine if the data stream is to be placed in the data cache, determining if the data stream is to be placed in the data cache comprising:

determining that no cache pages stored in the data cache include data having a second confidence score that is lower than the first confidence score of the data stream; and in response, placing the data stream in a disk rather than placing the data stream in the data cache.

18. The non-transitory storage medium of claim 11, wherein the caching algorithm implements a caching parameter that specifies the first trust metadata of the data stream as the criteria to be used to determine if the data stream is to be placed in the data cache, determining if the data stream is to be placed in the data cache comprising:

determining that a cache page stored in the data cache includes data that is associated with second trust metadata that is different from the first trust metadata of the data stream;

in response, removing the cache page from the data cache; and placing the data stream in the data cache in place of the cache page that has been removed, wherein the cache page is removed from the data cache even if the cache page includes data having a second confidence score that is higher than the first confidence score of the data stream.

19. The non-transitory storage medium of claim 11, wherein the caching algorithm implements a first caching parameter that specifies a lowest confidence score as the criteria to be used to determine if the data stream is to be placed in the data cache, determining if the data stream is to be placed in the data cache comprising:

determining that a first cache page stored in the data cache includes data having a second confidence score that is lower than the first confidence score of the data stream and that a second cache page stored in the data cache includes data having a third confidence score that is lower than the first confidence score of the data stream;

in response, implementing a second caching parameter that specifies one of a least-recently-used cache page or a most-recently used cache page as the criteria to be used to determine if the data stream is to be placed in the data cache;

in response, determining that the first cache page is one of a least-recently-used cache page or a most-recently used cache page;

in response, removing the first cache page from the data cache; and placing the data stream in the data cache in place of the first cache page that has been removed.

20. The non-transitory storage medium of claim 11, wherein the caching algorithm implements a first caching parameter that specifies a lowest confidence score as the criteria to be used to determine if the data stream is to be placed in the data cache, determining if the data stream is to be placed in the data cache comprising:

determining that a first cache page stored in the data cache includes data having a second confidence score that is lower than the first confidence score of the data stream and that a second cache page stored in the data cache includes data having a third confidence score that is lower than the first confidence score of the data stream;

in response, implementing a second caching parameter that specifies the first trust metadata of the data stream as the criteria to be used to determine if the data stream is to be placed in the data cache;

in response, determining that the first cache page includes data that is associated with second trust metadata that is different from the first trust metadata of the data stream;

in response, removing the first cache page from the data cache; and placing the data stream in the data cache in place of the first cache page that has been removed.

* * * * *